United States Patent
Namuduri et al.

(10) Patent No.: US 12,191,686 B2
(45) Date of Patent: Jan. 7, 2025

(54) SYSTEM AND METHOD FOR MODULAR DYNAMICALLY ADJUSTABLE CAPACITY STORAGE

(71) Applicant: GM GLOBAL TECHNOLOGY OPERATIONS LLC, Detroit, MI (US)

(72) Inventors: Chandra S. Namuduri, Troy, MI (US); Dave G. Rich, Sterling Heights, MI (US); Lyall K. Winger, Waterloo (CA); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 698 days.

(21) Appl. No.: 17/467,758

(22) Filed: Sep. 7, 2021

(65) Prior Publication Data

US 2023/0074308 A1    Mar. 9, 2023

(51) Int. Cl.
*H02J 7/00* (2006.01)
*B60L 50/60* (2019.01)
*H01M 10/42* (2006.01)

(52) U.S. Cl.
CPC ............ *H02J 7/0024* (2013.01); *B60L 50/66* (2019.02); *H01M 10/425* (2013.01); *H02J 2310/48* (2020.01)

(58) Field of Classification Search
CPC ..................................................... H02J 7/0024
USPC ......................................................... 320/117
See application file for complete search history.

(56) References Cited

U.S. PATENT DOCUMENTS

| | | | | |
|---|---|---|---|---|
| 2012/0176820 A1* | 7/2012 | Li | ..................... | H02M 3/33507 363/21.12 |
| 2020/0153050 A1* | 5/2020 | Winger | ................... | B60L 58/21 |
| 2020/0276911 A1* | 9/2020 | Rich | ....................... | B60L 58/21 |
| 2021/0151809 A1* | 5/2021 | Kong | ................. | G01R 31/3835 |

* cited by examiner

*Primary Examiner* — Yalkew Fantu
(74) *Attorney, Agent, or Firm* — Quinn IP Law

(57) ABSTRACT

A system for modular dynamically adjustable capacity storage for a vehicle is provided. The system includes a battery pack including a plurality of battery cells, a negative terminal including a chassis ground connection, and a plurality of positive battery pack terminals. The negative terminal and the plurality of positive battery pack terminals are useful for connecting at least one electrical circuit through the battery pack. The system further includes a battery cell switching system, including a plurality of solid-state switches connected to each of the battery cells. The plurality of solid-state switches is operable to selectively connect a portion of the battery cells in parallel, selectively connect the portion of the battery cells in series, and selectively connect one of the plurality of battery cells to one of the plurality of positive battery pack terminals.

20 Claims, 6 Drawing Sheets

SYSTEM AND METHOD FOR MODULAR DYNAMICALLY ADJUSTABLE CAPACITY STORAGE

INTRODUCTION

The disclosure generally relates to a system and method for modular dynamically adjustable capacity storage.

Battery cells may include an anode, a cathode, a separator or membrane, and an electrolyte. A battery cell may operate in charge mode, receiving electrical energy. A battery cell may operate in discharge mode, providing electrical energy. A battery cell may operate through charge and discharge cycles, where the battery first receives and stores electrical energy and then provides electrical energy to a connected system. In vehicles utilizing electrical energy to provide motive force, battery cells of the vehicle may be charged, and then the vehicle may navigate for a period of time, utilizing the stored electrical energy to generate motive force.

A battery cell in functional operation provides electrical energy through a pair of external terminals. These terminals provide electrical energy at a particular voltage. This electrical energy may be selectively provided to various systems within a vehicle to provide functionality in the various systems.

SUMMARY

A system for modular dynamically adjustable capacity storage for a vehicle is provided. The system includes a battery pack including a plurality of battery cells, a negative terminal including a chassis ground connection, and a plurality of positive battery pack terminals. The negative terminal and the plurality of positive battery pack terminals are useful for connecting at least one electrical circuit through the battery pack. The system further includes a battery cell switching system, including a plurality of solid-state switches connected to each of the battery cells. The plurality of solid-state switches is operable to selectively connect a portion of the battery cells in parallel, selectively connect the portion of the battery cells in series, and selectively connect one of the plurality of battery cells to one of the plurality of positive battery pack terminals.

In some embodiments, one of the plurality of solid-state switches includes one of a field-effect transistor, a silicon metal-oxide-semiconductor field-effect transistor, a gallium nitride field-effect transistor, a silicon carbide metal-oxide-semiconductor field-effect transistor, or an insulated-gate bipolar transistor.

In some embodiments, one of the plurality of solid-state switches includes a uni-directional voltage blocking capability.

In some embodiments, one of the plurality of solid-state switches includes a bi-directional voltage blocking capability.

In some embodiments, the plurality of solid-state switches is further operable to simultaneously provide electrical energy at 48 Volts through a first of the plurality of positive battery pack terminals, electrical energy at 12 Volts through a second of the plurality of positive battery pack terminals, and electrical energy at 12 Volts through a third of the plurality of positive battery pack terminals.

In some embodiments, one of the plurality of solid-state switches is selectively operable in an on/off mode and in a linear mode providing impedance matching.

In some embodiments, the battery pack includes four battery cells. The battery cell switching system is further operable to selectively connect the four battery cells in series.

In some embodiments, each of the four battery cells includes a battery cell voltage of 12 Volts. The battery cell switching system selectively connecting the four battery cells in series is operable to provide electrical energy at 48 Volts through one of the plurality of positive battery pack terminals.

In some embodiments, the battery pack further includes four additional battery cells. The battery cell switching system is further operable to selectively connect the four additional battery cells in parallel.

In some embodiments, the battery pack further includes eight additional battery cells. The battery cell switching system is further operable to selectively connect the eight additional battery cells in parallel.

In some embodiments, the battery pack further includes eight additional battery cells. The battery cell switching system selectively connecting the four battery cells in series is operable to provide electrical energy through a first of the plurality of positive battery pack terminals. The battery cell switching system is further operable to selectively connect a portion of the eight additional battery cells in parallel to a second of the plurality of positive battery pack terminals. The battery cell switching system is further operable to selectively connect a remaining portion of the eight additional battery cells in parallel to a third of the plurality of positive battery pack terminals.

In some embodiments, the system further includes a computerized battery cell switching controller operable to determine an operating mode for the vehicle and control the battery cell switching system based upon the operating mode.

In some embodiments, the operating mode is one of an off/test mode, a cold crank mode, a run mode, an auto-start mode, or a regenerative braking/boosting motor mode.

In some embodiments, the battery cell switching system is further operable to provide electrical energy simultaneously to a first 12 Volt circuit and a second 12 Volt circuit. The operating mode is one of a first 12 Volt circuit fault mode or a second 12 Volt circuit fault mode.

According to one alternative embodiment, a system for modular dynamically adjustable capacity storage for a vehicle is provided. The system includes a battery pack including a plurality of battery cells each includes a battery cell voltage of 12 Volts, a negative terminal including a chassis ground connection, and a plurality of positive battery pack terminals. The negative terminal and the plurality of positive battery pack terminals are useful for connecting at least one electrical circuit through the battery pack. The system further includes a battery cell switching system, including a plurality of solid-state switches connected to each of the battery cells. The plurality of solid-state switches is operable to selectively connect a portion of the battery cells in parallel to provide electrical energy at 12 Volts, selectively connect the portion of the battery cells in series to provide electrical energy at 48 Volts, and selectively connect one of the plurality of battery cells to one of the plurality of positive battery pack terminals.

In some embodiments, one of the plurality of solid-state switches includes one of a field-effect transistor, a silicon metal-oxide-semiconductor field-effect transistor, a gallium nitride field-effect transistor, a silicon carbide metal-oxide-semiconductor field-effect transistor, or an insulated-gate bipolar transistor.

According to one alternative embodiment, a method for modular dynamically adjustable capacity storage in a vehicle is provided. The method includes utilizing a battery pack including a plurality of battery cells to provide electrical energy to the vehicle through a negative chassis ground connection and one of a plurality of positive battery pack terminals. The method further includes controlling a battery cell switching system including a plurality of solid-state switches attached to each of the plurality of battery cells. The plurality of solid-state switches is operable to selectively connect a portion of the battery cells in parallel, selectively connect the portion of the battery cells in series, and selectively connect one of the plurality of battery cells to one of the plurality of positive battery pack terminals.

In some embodiments, the method further includes, within a computerized battery cell switching controller, determining an operating mode of the vehicle and controlling the battery cell switching system based upon the operating mode.

The above features and advantages and other features and advantages of the present disclosure are readily apparent from the following detailed description of the best modes for carrying out the disclosure when taken in connection with the accompanying drawings.

DETAILED DESCRIPTION

Figure 1:
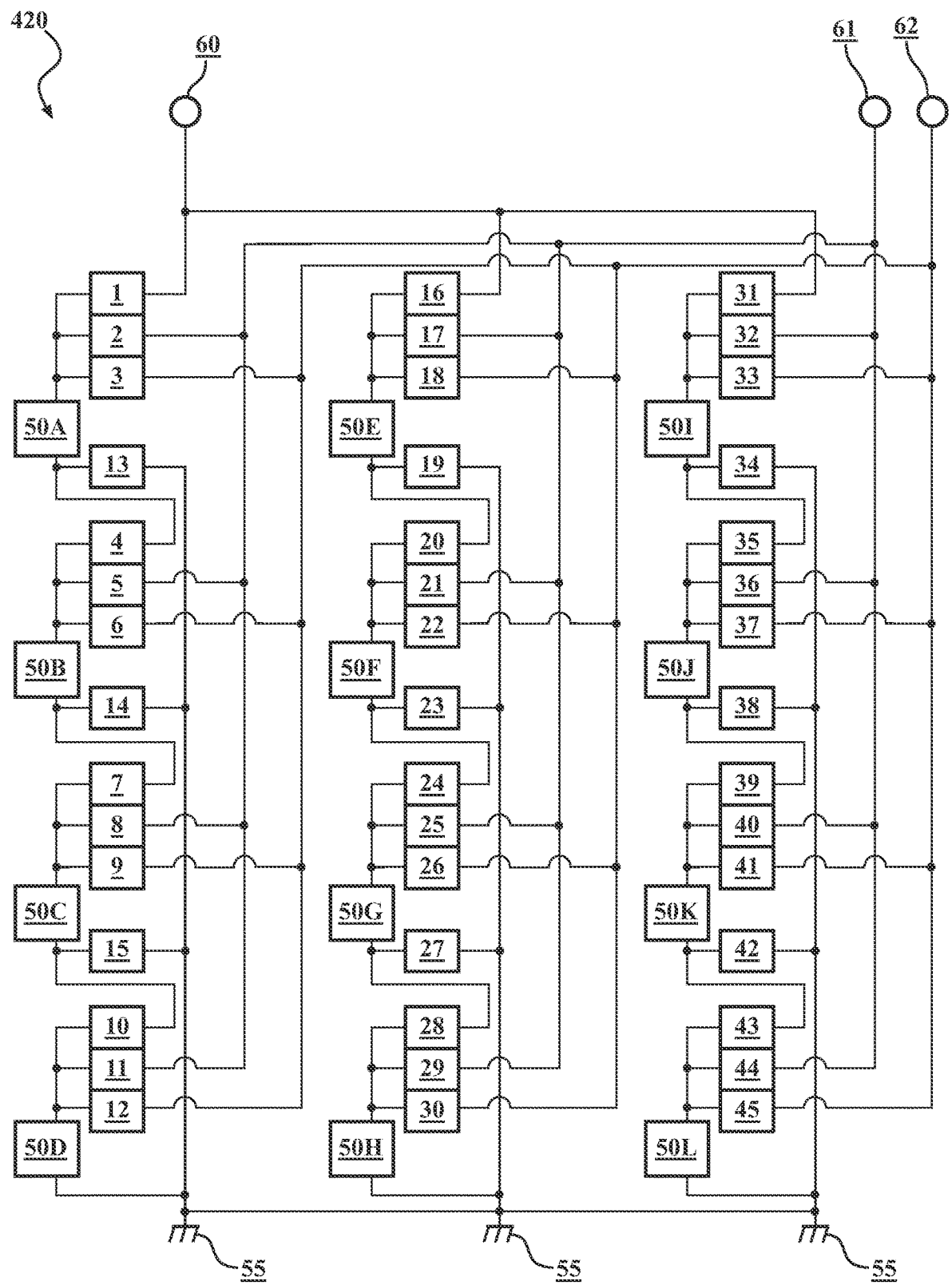
FIG. 1 schematically illustrates a battery cell switching system operable to selectively connect each of a plurality of battery cells to a plurality of battery pack terminals, in accordance with the present disclosure.

A battery pack may include a plurality of battery cells. A vehicle powered by a battery pack or a system including a plurality of battery packs may include a plurality of battery cells. Each battery cell may include an anode, a cathode, a separator membrane, and an electrolyte. Each battery cell, when charged with electrical energy, may provide electrical energy at a voltage. The voltage is determined by the configuration of the battery, a state of charge (SOC) contained within the battery, and a state of health (SOH) of the battery. Throughout the disclosure, battery cell voltage or a design battery cell voltage is intended to describe a battery cell voltage when both an SOC and an SOH are at ideal conditions such that the battery cell is delivering electrical energy at a nominal capacity.

A battery cell voltage describes a voltage at which electrical energy is provided at the two terminals of the battery cell. Depending upon an electrical resistance or impedance in a circuit connecting the two terminals, the battery cell is capable of providing an electrical current measured in amps.

Battery cells may be connected to each other in series to increase a voltage that may be delivered from a battery pack. Connecting a two battery cells in series includes providing an electrical connection between a negative terminal of the first battery cell and a positive terminal of the second battery cell. The positive terminal of the first battery cell and the negative terminal of the second battery cell are then capable of delivering electrical energy at a sum of the voltages of the two battery cells. For example, a first 12 Volt battery cell may be connected in series with a second 12 Volt battery cell to provide electrical energy at 24 Volt. In another example, four 12 Volt battery cells may be connected in series to provide electrical energy at 48 Volt.

Battery cells may be connected to each other in parallel to increase a capacity or amp-hour capacity of the battery pack. By connecting the positive terminals of a plurality of battery cells and connecting the negative terminals of the plurality of battery cells (assuming a same battery cell voltage for the plurality of battery cells,) the connected positive terminals and the connected negative terminals may deliver electrical energy at the battery cell voltage of the battery cells, with an amp-hour capacity equal to a sum of the amp-hour capacities of the plurality of battery cells.

A group of battery cells may be defined as a string or a string of battery cells. A battery pack may include a plurality of strings which each include a plurality of battery cells. Each of the strings may be controlled separately to provide multiple operation modes for the battery pack. The following operation modes assume that the battery cells in the battery pack include a common battery cell voltage. In one embodiment, the battery cells of the battery pack may be connected in parallel and are connected to a common battery pack positive terminal and a common battery pack negative terminal. Such an operation mode provides electrical energy at the battery cell voltage of each of the battery cells at a maximum amp-hour capacity of the battery pack. Such an operation mode may be described as a cold crank mode, where the battery pack is operable to provide as much electrical current as possible to start an engine.

Another operation mode may be defined where a first portion of the battery cells in the battery pack are connected in parallel and are connected to a first battery pack positive terminal and a first battery pack negative terminal. Additionally, a second portion of the battery cells in the battery pack are connected in parallel and are connected to a second battery pack positive terminal and a second battery pack negative terminal. In one embodiment, the selection of the first portion and the second portion may be made by defined strings of battery cells. For example, if a battery pack includes three strings of battery cells, a first string may be defined as the first portion of the battery cells and a second string and a third string, collectively, may be defined as the second portion of the battery cells. Vehicles may be configured to save energy by utilizing an auto-stop, auto-start vehicle mode, with the vehicle shutting down some systems while the vehicle is stopped, for example, at a stop light. Such an operation mode of the battery, dividing the battery cells into two portions, may be described as an automatic start mode. In an automatic start mode, the second portion, including an amp-hour capacity equal to a sum of the amp-hour capacities of battery cells within two of the three strings, includes a majority of the amp-hour capacity of the battery pack which may be useful to automatically start the vehicle operating in the auto-stop, auto-start mode. A remaining portion of the battery cells, the first portion, may be utilized to maintain vehicle systems such as hydraulic brakes, signal lights, a radio, and windshield wipers, while the vehicle may be otherwise stopped in the auto-stop, auto-start vehicle mode.

Some vehicle systems may operate at a common or low voltage level. In one example, 12 Volt battery systems have been operated for decades. Many vehicle systems such as signal lights and instrument panel features may be operated at relatively high efficiency at 12 Volts. Some vehicle systems operate more efficiently at higher voltage levels. For example, regenerative braking systems which translate kinetic energy available in the speed of the vehicle into electrical energy for storage in a battery pack, may operate more efficiently at 48 Volts than at 12 Volts. In another example, an electric vehicle may operate a boosting motor to provide extra output torque to wheels of the vehicle. A boosting motor may operate more efficiently at 48 Volts than at 12 Volts. A vehicle may benefit from simultaneously operating vehicle systems at two different voltages.

Another operation mode may be defined where a first portion of the battery cells in the battery pack are connected in parallel and are connected to a first battery pack positive terminal and a first battery pack negative terminal. Additionally, a second portion of the battery cells in the battery pack are connected in series and are connected to a second battery pack positive terminal and a second battery pack negative terminal. In this way, the first battery pack positive terminal and the first battery pack negative terminal provide electrical energy at a first, lower voltage, and the second battery pack positive terminal and the second battery pack negative terminal provide electrical energy at a second, higher voltage. Such an operating mode may be described as a regeneration/boost mode, wherein electrical energy is made available at the first, lower voltage to operate a set of vehicle systems and electrical energy is also made available at the second, higher voltage to operate one of regenerative braking and a boosting motor.

Some vehicles benefit from utilizing redundant systems. For example, an electric vehicle operating a non-redundant electrical system may cease to work and strand passengers if the electrical system fails. By providing a redundant electrical system, for example, providing a first 12 Volt electrical subsystem and a second 12 Volt electrical subsystem, the redundant electrical system may react to a failure of one of the electrical subsystems by isolating the failed subsystem and routing electrical power through the remaining, operational electrical subsystem. Such an operational mode may be described as a 12 Volt fault mode. In one embodiment, with two defined 12 Volt electrical subsystems defined, a 12 Volt fault mode may be defined for each of the two subsystems, each of the two 12 Volt fault modes may be utilized to react to a fault or failure in the respective 12 Volt electrical subsystem.

Given a battery pack with a plurality of battery cells, a system of electronically controlled switches may be utilized to selectively connect one battery cell to another battery cell. Electronically controlled switches may be utilized to connect a plurality of battery cells in series or in parallel. Electronically controlled switches may be utilized to connect a first group of battery cells in series, a second group of battery cells in series, and connect the first group of battery cells and the second group of battery cells to each other in parallel.

A computerized battery cell switching controller is provided which may be utilized to monitor electrical needs of various systems within a vehicle, monitor data related to a plurality of battery cells within a battery pack, and control switches selectively connecting the plurality of battery cells to each of a plurality of battery pack terminals based upon the electrical need and the monitored data. The controller enables a system and method for a modular dynamically allocated capacity storage system with single or multiple output voltages. The system may include multi-functional solid-state switches, switch driver circuits, current and voltage sense circuits arranged in a minimum switch count topology to enable on-demand capacity allocation with a single or multiple outputs with similar or dissimilar voltages.

The disclosed system and method may be described as utilizing soft-switching techniques, using semiconductor devices to modulate operation of the battery system. Such soft-switching may be an excellent alternative to mechanical switching techniques. Mechanical switching may lead to high changes in current in a short period of time (dI/dt). Such high dI/dt values may have multiple adverse effects. For example, large surges in current may cause blowback or damage to field-effect transistor (FET) circuits. Large voltage spikes, for example, caused by induction (which may be described by $V=L*(dI/dt)$, may cause negative voltage spikes and undervoltage latch-up. Latch-up may be described as accidentally turning on a silicon-controlled rectifier. Utilizing soft-switching can reduce the current change per unit time, thereby avoiding latch-up and help prevent under-voltage conditions in diode junctions. Further, soft-switching may avoid noisy operation conditions cause by high dI/dt voltage spikes.

Referring now to the drawings, wherein like reference numbers refer to like features throughout the several views, FIG. 1 schematically illustrates a battery cell switching system 420 operable to selectively connect each of a plurality of battery cells to a plurality of battery pack terminals. A battery cell 50A, a battery cell 50B, a battery cell 50C, a battery cell 50D, a battery cell 50E, a battery cell 50F, a battery cell 50G, a battery cell 50H, a battery cell 50I, a battery cell 50J, a battery cell 50K, a battery cell 50L are illustrated and may collectively be described as a plurality of battery cells of a battery pack. In one embodiment, each of the plurality of battery cells may be operable to provide electrical energy with 12 Volts potential at terminals of the battery cell.

Each of the plurality of battery cells is connected to a plurality of electronically controlled switches. An electronic switch 1, an electronic switch 2, an electronic switch 3, an electronic switch 4, an electronic switch 5, an electronic switch 6, an electronic switch 7, and an electronic switch 8 are illustrated. An electronic switch 9, an electronic switch 10, an electronic switch 11, an electronic switch 12, an electronic switch 13, an electronic switch 14, an electronic switch 15, and an electronic switch 16 are illustrated. An electronic switch 17, an electronic switch 18, an electronic switch 19, an electronic switch 20, an electronic switch 21, an electronic switch 22, an electronic switch 23, and an electronic switch 24 are illustrated. An electronic switch 25, an electronic switch 26, an electronic switch 27, an electronic switch 28, an electronic switch 29, an electronic switch 30, an electronic switch 31, and an electronic switch 32 are illustrated. An electronic switch 33, an electronic switch 34, an electronic switch 35, an electronic switch 36, an electronic switch 37, an electronic switch 38, an electronic switch 39, and an electronic switch 40 are illustrated. An electronic switch 41, an electronic switch 42, an electronic switch 43, an electronic switch 44, and an electronic switch 45 are illustrated.

A battery pack terminal 60, a battery pack terminal 61, and a battery pack terminal 62 are illustrated. At least one chassis ground connection 55 is illustrated. The plurality of electronic switches of the battery cell switching system 420 may be selectively activated and deactivated to control electrical energy supplied to vehicle systems connected to the battery pack terminal 60, the battery pack terminal 61, the battery pack terminal 62, and the chassis ground connection 55. For connected vehicle systems, one of the battery pack terminal 60, the battery pack terminal 61, and the battery pack terminal 62 may act as a positive battery pack terminal. For the connected vehicle systems, the chassis ground connection 55 may act as a negative battery pack terminal. The number of the plurality of connected battery cells, the nominal battery cell voltage of each of the plurality of battery cells, the number of battery pack terminals, and the number of electronic switches provided for each battery cell may be different for different embodiments of the battery cell switching system, and the disclosure is not intended to be limited to the particular examples provided herein.

Taking the battery cell 50C as an example, the electronic switch 7 is provided to selectively connect the battery cell to the battery cell 50B in series.

The electronic switch 8 is provided to selectively connect the battery cell 50C to the battery pack terminal 61. Other similar switches, for example, the electronic switch 5 selectively connecting the battery cell 50B to the battery pack terminal 61, may additionally connect other of the plurality of battery cells to the battery pack terminal 61, such that the battery cell 50C and the other connected battery cells are connected to the battery pack terminal 61 in parallel.

Similarly, the electronic switch 9 is provided to selectively connect the battery cell 50C to the battery pack terminal 62. Other similar switches, for example, the electronic switch 6 selectively connecting the battery cell 50B to the battery pack terminal 62, may additionally connect other of the plurality of battery cells to the battery pack terminal 62, such that the battery cell 50C and the other connected battery cells are connected to the battery pack terminal 62 in parallel.

The electronic switch 15 is provided to selectively connect the battery cell 50C to the chassis ground connection 55.

The electronic switch 7, the electronic switch 8, the electronic switch 9, and the electronic switch 15 may be put into context with other electronic switches of the battery cell switching system 420. For example, by activating the electronic switch 10, the electronic switch 7, and the electronic switch 4, the battery cell 50D, the battery cell 50C, the battery cell 50B, and the battery cell 50A may be connected in series to supply electrical energy including a voltage equal to the sum of the voltages of the battery cell 50D, the battery cell 50C, the battery cell 50B, and the battery cell 50A. By activating the electronic switch 1, the series of battery cells including the battery cell 50D, the battery cell 50C, the battery cell 50B, and the battery cell 50A may be connected to the battery pack terminal 60. Alternatively, by activating the electronic switch 2, the series of battery cells including the battery cell 50D, the battery cell 50C, the battery cell 50B, and the battery cell 50A may be connected to the battery pack terminal 61. Alternatively, by activating the electronic switch 3, the series of battery cells including the battery cell 50D, the battery cell 50C, the battery cell 50B, and the battery cell 50A may be connected to the battery pack terminal 62. In an example where each the battery cell 50D, the battery cell 50C, the battery cell 50B, and the battery cell 50A include a battery cell voltage of 12 Volts, activation of the described series of battery cells and selective activation of one of the electronic switch 1, the electronic switch 2, and the electronic switch 3, electrical energy with a potential of 48 Volts, in relation to the chassis ground connection 55, may be provided to a selected, respective one of the battery pack terminal 60, the battery pack terminal 61, and the battery pack terminal 62.

Similarly, selective activation of electronic switch 28, electronic switch 24, and electronic switch 20 may be utilized to connect the battery cell 50H, the battery cell 50G, the battery cell 50F, and the battery cell 50E in series, and selective activation of the electronic switch 16, the electronic switch 17, and the electronic switch 18 may be utilized to connect the series of battery cells including the battery cell 50H, the battery cell 50G, the battery cell 50F, and the battery cell 50E to a selected, respective one of the battery pack terminal 60, the battery pack terminal 61 and the battery pack terminal 62.

Similarly, selective activation of electronic switch 43, electronic switch 39, and electronic switch 35 may be utilized to connect the battery cell 50L, the battery cell 50K, the battery cell 50J, and the battery cell 50I in series, and selective activation of the electronic switch 31, the electronic switch 32, and the electronic switch 33 may be utilized to connect the series of battery cells including the battery cell 50L, the battery cell 50K, the battery cell 50J, and the battery cell 50I to a selected, respective one of the battery pack terminal 60, the battery pack terminal 61 and the battery pack terminal 62.

As described herein, the series of battery cells including the battery cell 50A, the battery cell 50B, the battery cell 50C, and the battery cell 50D may be used to provide electrical energy at 48 Volts. Similarly, the series of battery cells including the battery cell 50E, the battery cell 50F, the battery cell 50G, and the battery cell 50H may be used to provide electrical energy at 48 Volts. Similarly, the series of battery cells including the battery cell 50I, the battery cell 50J, the battery cell 50K, and the battery cell 50L may be used to provide electrical energy at 48 Volts. Each of these series of battery cells may be connected individually to one of the battery pack terminal 60, the battery pack terminal 61, or the battery pack terminal 62. Any two or the three of the series of battery cells may be connected in parallel to one of the battery pack terminal 60, the battery pack terminal 61, or the battery pack terminal 62.

The plurality of electronic switches of the battery cell switching system 420 may be utilized to connect any of the plurality of battery cells to one of the battery pack terminal 60, the battery pack terminal 61, or the battery pack terminal 62, thereby providing electrical energy to the one of the battery pack terminal 60, the battery pack terminal 61, or the battery pack terminal 62 at the battery cell voltage of the respective battery cell. Any portion of the plurality of battery cells may be connected in parallel to a first one of the battery pack terminal 60, the battery pack terminal 61, or the battery pack terminal 62. Any remaining portion of the plurality of battery cells may be connected in parallel to a second one of the battery pack terminal 60, the battery pack terminal 61, or the battery pack terminal 62.

The battery cell 50D, the battery cell 50H, and the battery cell 50L are connected to the chassis ground connection. Therefore, activation of a single electronic switch, the electronic switch 11, the electronic switch 29, and the electronic switch 44, may be utilized to connect the respective battery cell, the battery cell 50D, the battery cell 50H, and the battery cell 50L, to the battery pack terminal 61. This configuration creates a voltage potential across the battery pack terminal 61 and the chassis ground connection 55 equal to the common battery cell voltage of each of the battery cell 50D, the battery cell 50H, and the battery cell 50L. This configuration further provides an amp-hour capacity equal to the sum of the battery cell 50D, the battery cell 50H, and the battery cell 50L. In the alternative, the electronic switch 12, the electronic switch 30, and the electronic switch 45 may be used to connect the battery cell 50D, the battery cell 50H, and the battery cell 50L in parallel to provide electrical energy to the battery pack terminal 62.

The battery cell 50D, the battery cell 50H, and the battery cell 50L are connected to the chassis ground connection; a remainder of the plurality of battery cells are not directly connected to the chassis ground connection. An electronic switch is provided for each of the plurality of battery cells not directly connected to the chassis ground connection to selectively connect each of the battery cells not directly connected to the chassis ground connection to the chassis ground connection. The electronic switch 13 selectively connects the battery cell 50A to the chassis ground connection 55. The electronic switch 14 selectively connects the battery cell 50B to the chassis ground connection 55. The electronic switch 15 selectively connects the battery cell 50C to the chassis ground connection 55. The electronic switch 19 selectively connects the battery cell 50E to the chassis ground connection 55. The electronic switch 23 selectively connects the battery cell 50F to the chassis ground connection 55. The electronic switch 27 selectively connects the battery cell 50G to the chassis ground connection 55. The electronic switch 34 selectively connects the battery cell 50I to the chassis ground connection 55. The electronic switch 38 selectively connects the battery cell 50J to the chassis ground connection 55. The electronic switch 42 selectively connects the battery cell 50K to the chassis ground connection 55. By activating a selective first electronic switch to connect to the ground chassis connection 55 a respective one of the plurality of battery cells not directly connected to the ground chassis connection 55, an activation of a selective second electronic switch may connect the battery cell not directly connected to the chassis ground connection 55 to one of the battery pack terminal 61 and the battery pack terminal 62, thereby selectively creating a potential circuit through the battery cell. For example, activation of the electronic switch 23 and activation of the electronic switch 22 may connect the battery cell 50F to both the chassis ground connection 55 and the battery pack terminal 62. Additionally, the electronic switch 42 and the electronic switch 41 may be activated to connect the battery cell 50K to both the chassis ground connection 55 and the battery pack terminal 62. In this way, the battery cell 50F and the battery cell 50K may be connected in parallel to the chassis ground connection 55 and the battery pack terminal 62.

The battery cell switching system 420 may provide electrical connections to provide electrical energy at 12 Volts or 48 Volts to the battery pack terminal 60, the battery pack terminal 61, and/or the battery pack terminal 62 individually or simultaneously. The following Table 1 provides an exemplary listing of operational modes and corresponding switch activations that may be utilized with the battery cell switching system 420. The Table 1 assumes that each of the plurality of battery cells includes a battery cell voltage of 12 Volts (V) and an amp-hour capacity of 6 amp-hours (Ah).

TABLE 1

| Operational Mode | 48V Sub-system | 12V Sub-system A | 12VB Sub-system B | Electronic Switches ON |
|---|---|---|---|---|
| Off Test/ Mode | 0 Ah | 0 Ah | 72 Ah | 3, 6, 9, 12, 13, 14, 15, 18, 19, 22, 23, 26, 27, 30, 33, 34, 37, 38, 41, 42, 45 |
| Aux Mode | 0 Ah | 0 Ah | 72 Ah | 3, 6, 9, 12, 13, 14, 15, 18, 19, 22, 23, 26, 27, 30, 33, 34, 37, 38, 41, 42, 45 |
| Cold Crank | 0 Ah | 0 Ah | 72 Ah | 3, 6, 9, 12, 13, 14, 15, 18, 19, 22, 23, 26, 27, 30, 33, 34, 37, 38, 41, 42, 45 |
| Run | 6 Ah | 24 Ah | 24 Ah | 1, 4, 7, 10, 17, 19, 21, 23, 25, 27, 29, 33, 34, 37, 38, 41, 42, 45 |
| Auto Start 12V | 0 Ah | 24 Ah | 48 Ah | 2, 5, 8, 11, 13, 14, 15, 18, 19, 22, 23, 26, 27, 30, 33, 34, 37, 38, 41, 42, 45 |
| Regen/ Boost | 12 Ah | 12 Ah | 12 Ah | 1, 4, 7, 10, 16, 20, 24, 28, 32, 34, 36, 38, 41, 42, 45 |
| 12VA Fault | 6 Ah | 0 Ah | 48 Ah | 1, 4, 7, 10, 18, 19, 22, 23, 26, 27, 30, 33, 34, 37, 38, 41, 42, 45 |
| 12VB Fault | 6 Ah | 48 Ah | 0 Ah | 1, 4, 7, 10, 17, 19, 21, 23, 25, 27, 29, 32, 34, 36, 38, 40, 42, 44 |

The exemplary switch activations to accomplish each operational mode is exemplary. Alternative switch activations may accomplish similar operational modes. For example, particular battery cells used in different duty cycles may be alternated to age or expend SOH for each of the battery cells approximately equally.

The battery cell switching system 420 may be described as a 12 Volt switching matrix design, with product architecture and switch controls to enable elimination of 12 Volt stabilization DC-DC (direct current to direct current) power converters, 48 Volt/12 Volt DC-DC power converters, and 12 Volt and/or 48 Volt redundant back-up power.

The disclosed system utilizes electronic switches to control electrical energy flowing through a vehicle battery system. These electronic switches may replace or make unnecessary DC-DC power converters that may be utilized to transform electrical energy at one voltage to electrical energy at another voltage. DC-DC power converters are inefficient as compared to solid-state electronic switches, and DC-DC power converters are relatively slow to react as compared to solid-state electronic switches. The disclosed electronic switches improve both efficiency and response time as compared to DC-DC power converters.

The battery cell switching system 420 described herein may utilize solid-state switches. Solid-state switches are semiconductor devices that have no moving parts. Solid-state switches utilize a control voltage or a signal providing control by modulating a voltage to activate or deactivate the switch. Solid-state switches are beneficial as being efficient, responsive, and low maintenance as compared to other switching devices in the art.

The battery cell switching system 420 may include a number of different physical devices to accomplish the switching functions described herein. For example, a circuit board may be equipped with controllable switch elements useful to achieve the described functionality. The controllable switch elements may include silicon MOSFETs (metal-oxide-semiconductor field-effect transistors), GaN FETs (gallium nitride field-effect transistors), SiC MOSFETs (silicon carbide metal-oxide-semiconductor field-effect transistors), IGBTs (insulated-gate bipolar transistors) or other similar electronically controllable devices. Switches may be utilized that enable uni-directional flow of electric current or uni-directional voltage blocking capability. Such uni-directional switches may be useful to prevent undesirable current flows within the system, for example, including flow from a battery cell with a relatively higher battery cell voltage to a battery cell with a relatively lower battery cell voltage. Switches with uni-directional voltage blocking capability may be used to minimize losses selectively. Switches may be utilized that enable bi-directional flow of electric current or bi-directional voltage blocking capability. Switches with bi-directional voltage blocking capability may be used to prevent a potential short between higher and lower voltage outputs. Switches may be utilized that are capable of operating in either on/off mode or linear mode for impedance matching purposes. Electronic switches described herein may be integrated together with drivers and interlock logic to prevent short circuit across modules, across different outputs or across outputs to ground.

Figure 2:
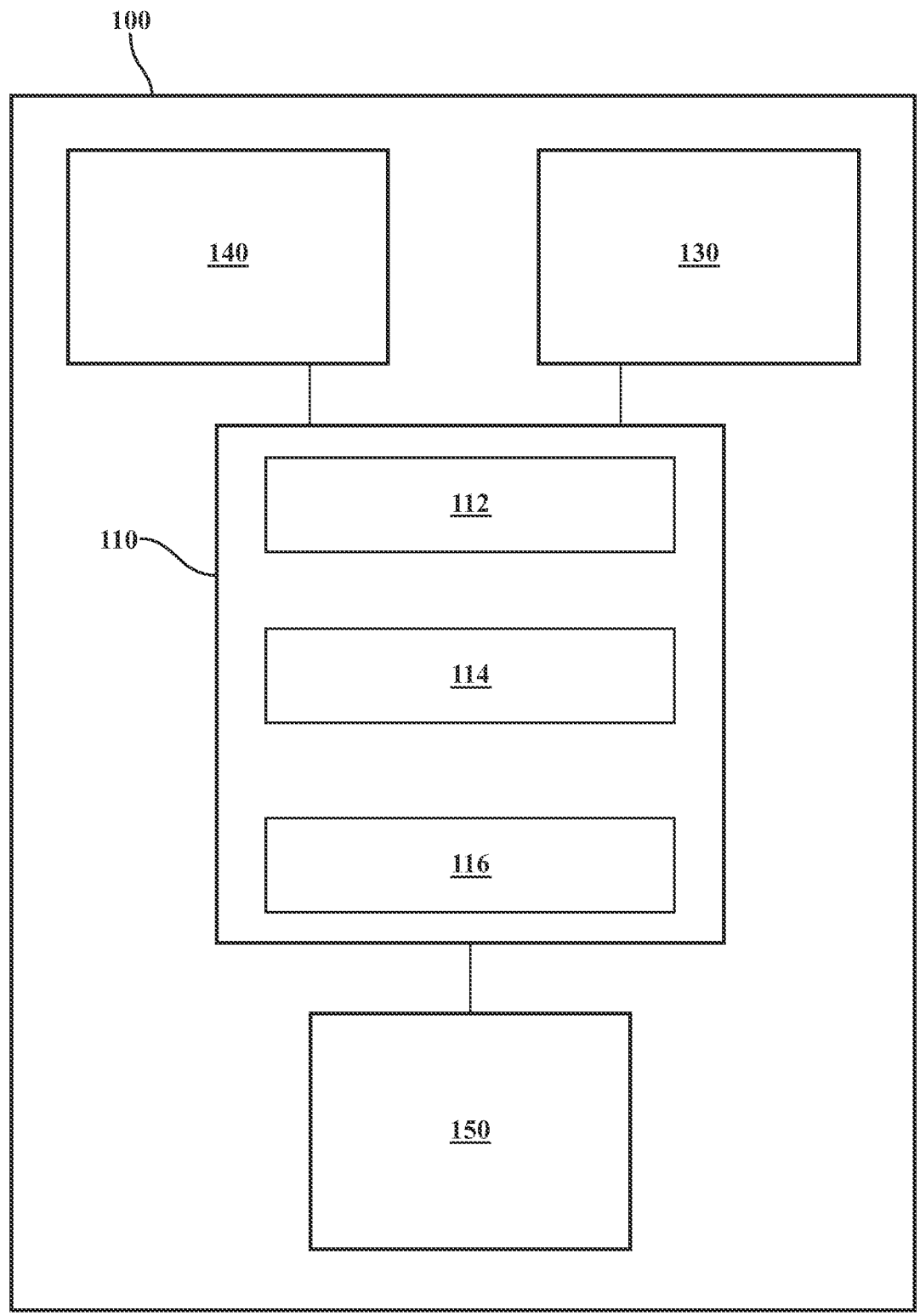
FIG. 2 schematically illustrates the computerized battery cell switching controller of FIG. 1, in accordance with the present disclosure.

FIG. 2 schematically illustrates the computerized battery cell switching controller 100. Computerized battery cell switching controller 100 includes processing device 110, communications device 130, data input output device 140, and memory storage device 150. It is noted that computerized battery cell switching controller 100 may include other components and some of the components are not present in some embodiments.

The processing device 110 may include memory, e.g., read only memory (ROM) and random-access memory (RAM), storing processor-executable instructions and one or more processors that execute the processor-executable instructions. In embodiments where the processing device 110 includes two or more processors, the processors may operate in a parallel or distributed manner. Processing device 110 may execute the operating system of the computerized battery cell switching controller 100. Processing device 110 may include one or more modules executing programmed code or computerized processes or methods including executable steps. Illustrated modules may include a single physical device or functionality spanning multiple physical devices. In the illustrative embodiment, the processing device 110 also includes an interlock logic module 112, a switch driver circuit module 114, and an operational mode module 116, which are described in greater detail below.

The data input output device 140 is a device that is operable to take data gathered from sensors and devices throughout the vehicle and process the data into formats readily usable by processing device 110. Data input output device 140 is further operable to process output from processing device 110 and enable use of that output by other devices or control modules throughout the vehicle.

The communications device 130 may include a communications/data connection with a bus device configured to transfer data to different components of the system and may include one or more wireless transceivers for performing wireless communication.

The memory storage device 150 is a device that stores data generated or received by the computerized battery cell switching controller 100. The memory storage device 150 may include, and is not limited to, a hard disc drive, an optical disc drive, and/or a flash memory drive.

The interlock logic module 112 may include logic useful to map switch activations that are useful to accomplish desired operational modes. The interlock logic module 112 may further include alternative switch activations that may be utilized to accomplish same or similar results. The interlock logic module 112 may include programming to avoid undesirable switch activations, for example, monitoring actual open circuit voltages for individual battery cells and avoiding parallel connections between battery cells with actual battery cell voltages that differ by more than a threshold voltage difference.

The switch driver circuit module 114 may include programming configured to control operation of the individual electronic switches, for example, providing commands, such as an electronic signal at a particular control voltage, to achieve desired switch activations and directional control over uni-directional and bi-directional electronic switches.

The operational mode module 116 may include programming to monitor parameters for the vehicle, for example, desired propulsion/braking of the vehicle, commands to operate various core and auxiliary vehicle systems, and a system electrical capacity request. The operational mode module 116 uses available information to control an operational mode through selections of electronic switches in the battery cell switching system 420 as programmed, for example, through the control methodology described in Table 1.

Computerized battery cell switching controller 100 is provided as an exemplary computerized device capable of executing programmed code to accomplish the methods and processes described herein. A number of different embodiments of computerized battery cell switching controller 100, devices attached thereto, and modules operable therein are envisioned, and the disclosure is not intended to be limited to examples provided herein.

Figure 3:
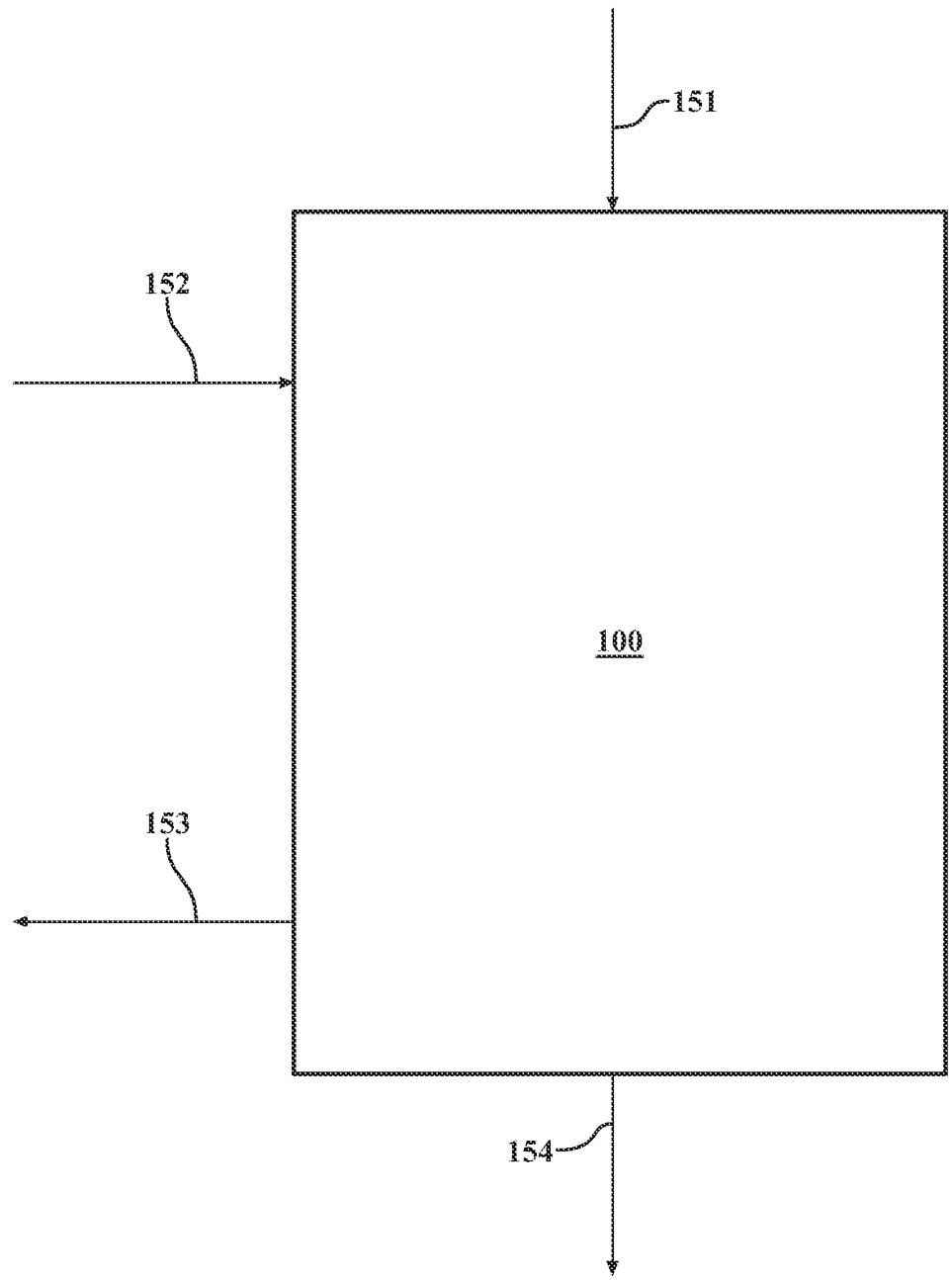
FIG. 3 schematically illustrates an exemplary flow of information monitored by and emanating from the computerized battery cell switching controller of FIG. 2, in accordance with the present disclosure.

FIG. 3 schematically illustrates an exemplary flow of information monitored by and emanating from the computerized battery cell switching controller 100. The computerized battery cell switching controller 100 monitors data 151 related to operation of the various battery cells, for example, open circuit voltages measured from each battery cell at times when the particular battery cell is neither charging or discharging electrical energy and temperature of each battery cell. Each battery cell may include sensors operable to provide data 151. The computerized battery cell switching controller 100 further monitors data 152 related to a system capacity request, for example, including a request to cold crank the vehicle to start or a request to perform regenerative braking. Programming implementing methods described herein within the computerized battery cell switching controller 100 utilizes data 151 and data 152 to determine and provide switch control outputs 153 and an actual capacity allocation 154. Switch control outputs 153 include commands to electronic switches within the battery cell switching system 420 to activate or deactivate, thereby controlling distribution of electrical energy from the plurality of battery cells controlled by the battery cell switching system 420. The actual capacity allocation 154 provides information related to whether and to what degree the plurality of battery cells will be able to fulfill the system capacity request. The actual capacity allocation 154 may include commands reacting to any shortfall in actual battery capacity, for example, commanding a temporary reduction in a climate control heating device output if battery capacity is useful to power a boosting motor.

Electronic switches described herein may provide on/off functionality, for example, providing a controller an ability to command that the switch be activated or deactivated. In another embodiment, the electronic switches may be utilized that enable on commands, off commands, and programmable current (resistance) modes of operation.

Figure 4:
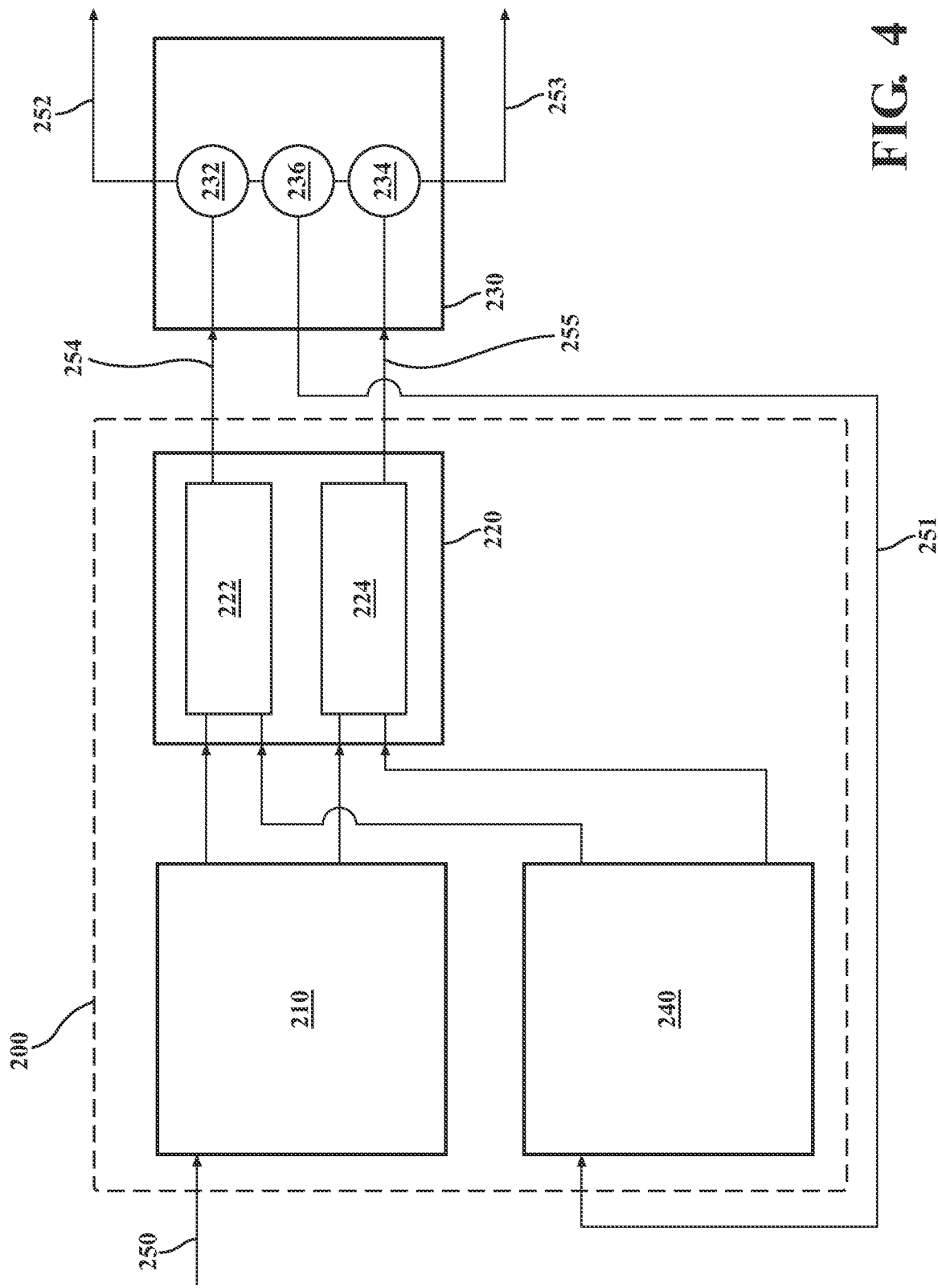
FIG. 4 schematically illustrates programmable current modes module which may be operated, for example, within the computerized battery cell switching controller of FIG. 2, in accordance with the present disclosure.

FIG. 4 schematically illustrates programmable current modes module 200 which may be operated, for example, within the computerized battery cell switching controller 100. The programmable current modes module 200 monitors a current command 250 and provides an output 254 and an output 255. The output 254 and the output 255 may include command signals with a voltage operable to control a first FET 232 and a second FET 234, respectively, through an FET and current sensor switch 230. Through controls over the output 254 and the output 255, operation of the first FET 232 and the second FET 234 may be utilized to provide bi-directional control over current flowing though circuit connection 252 and circuit connection 253. In one example, the first FET 232 and the second FET 234 are arranged in reciprocal fashion, such that the first FET 232 provides control over current flowing in one direction through the circuit connection 252 and the circuit connection 253 and such that the second FET 234 provides control over current flowing in a second direction through the circuit connection 252 and the circuit connection 253. Voltage of the output 254 and the output 255 may be utilized to provide scalar control over the control of current through the FET and current sensor switch 230. Such scalar control over the current may be utilized to selectively reduce a voltage output of a particular battery cell, for example, to match an actual battery cell voltage of a second battery cell. The FET and current sensor switch 230 includes a current sensor 236 which monitors a resulting current flowing through the circuit connection 252 and the circuit connection 253 and provides data signal 251 as feedback to the programmable current modes module 200.

The programmable current modes module 200 includes a filter and limiting module 210, P and I loop module 220, and current conditioning module 240. The P and I loop module 220 may include a first control loop 222 and a second control loop 224. The programmable current modes module 200 filters, conditions, and provides feedback control of the first FET 232 and the second FET 234.

In one exemplary embodiment, the current command 250 may result in a following control over the FET and current sensor switch 230: wherein the current command equals between zero and 10% duty, the corresponding switch is commanded to an off state; wherein the current command equals between 90% and 100% duty, the corresponding switch is commanded to an on state; and wherein the current command equals between 10% and 90% duty, a predetermined or calibrated current to be permitted through the FET and current sensor switch 230 is commanded.

Figure 5:
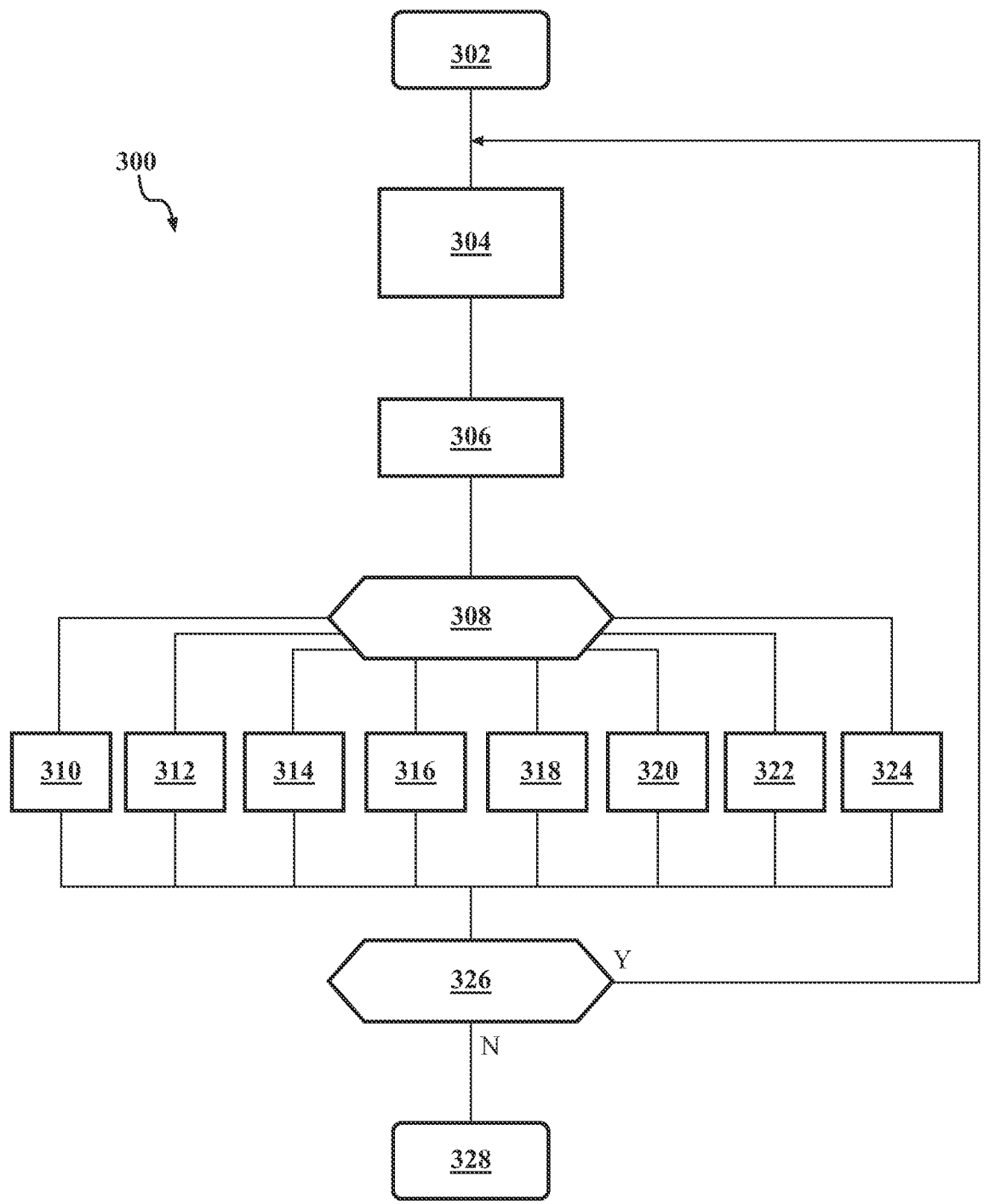
FIG. 5 is a flowchart illustrating a method for modular dynamically adjustable capacity storage in a vehicle, in accordance with the present disclosure.

FIG. 5 is a flowchart illustrating a method 300 for modular dynamically adjustable capacity storage in a vehicle. The method 300 starts at step 302. At step 304, data is collected and monitored related to a status of a plurality of battery cells, including open circuit voltage or SOC and temperature, and related to a system capacity request. At step 306, the monitored data is utilized to command an operational mode for a battery cell switching system including a plurality of electronic switches operable to control a flow of electrical energy between and among the plurality of battery cells and supplied to a plurality of battery pack terminals. Further, the monitored data may be utilized to provide an actual capacity allocation signal for use in controlling the vehicle. At step 308, the operational mode determined in step 306 is utilized to determine a set of switch activation and deactivation commands to be provided to the battery cell switching system, for example, as provided in Table 1 herein. Based upon the determined operational mode, switch commands are provided in a corresponding one of steps 310, 312, 314, 316, 318, 320, 322, and 324. Step 310 provides switch commands related to an off test mode. Step 312 provides switch commands related to an auxiliary mode. Step 314 provides switch commands related to a cold crank mode. Step 316 provides switch commands related to a run mode. Step 318 provides switch commands related to an auto start 12 Volt mode. Step 320 provides switch commands related to a regenerative braking/boost motor mode. Step 322 provides switch commands relative to a 12 Volt circuit A fault mode, wherein the vehicle is equipped with a redundant 12 Volt circuit A and a 12 Volt circuit B. Step 324 provides switch commands relative to a 12 Volt circuit B fault mode. At step 326, a determination is made whether the battery cell switching system is continuing to operate. If the system is continuing to operate, the method returns to reiterate step 304. If the system is not continuing to operate, the method advances to step 328 where the method ends. The method 300 is provided to illustrate exemplary operation of a method for modular dynamically adjustable capacity storage in a vehicle. A number of additional and/or alternative method steps are envisioned, and the disclosure is not intended to be limited to the examples provided herein.

Figure 6:
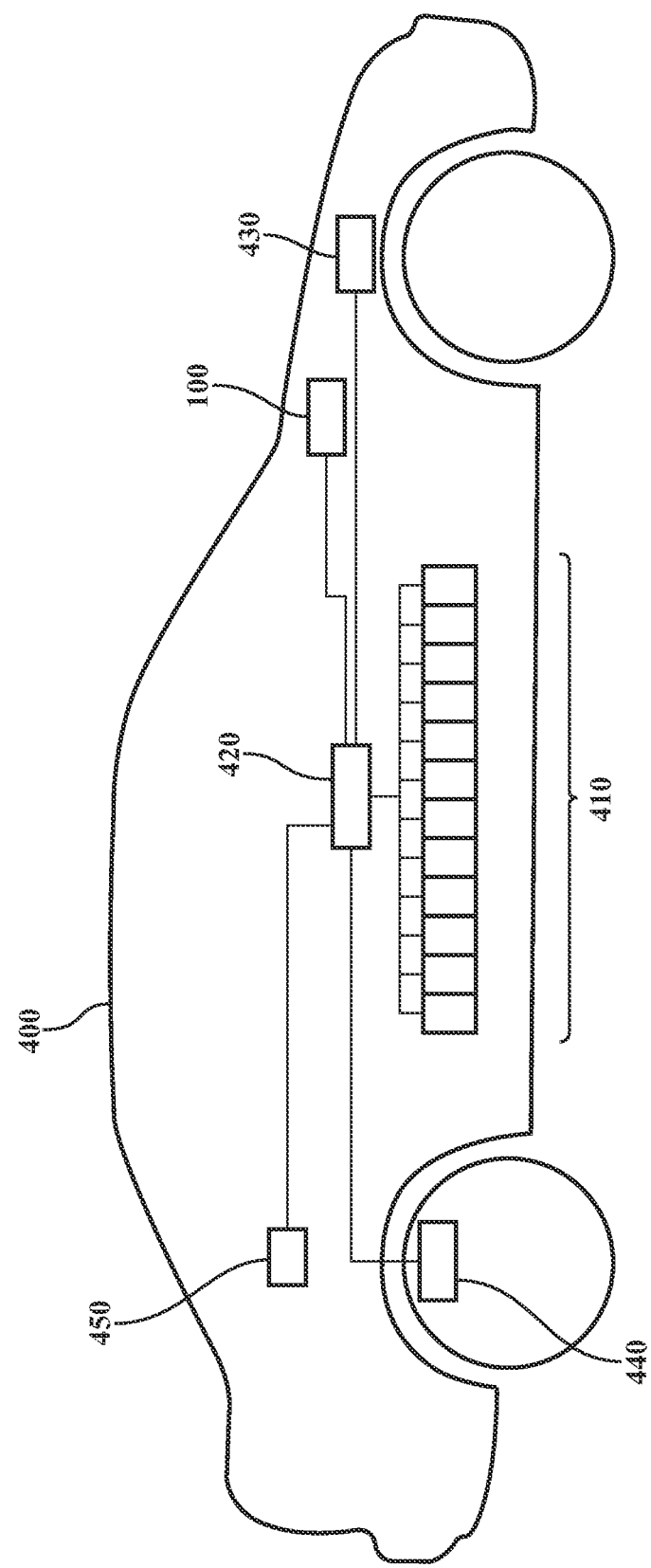
FIG. 6 schematically illustrates an exemplary vehicle including the battery cell switching system of FIG. 1, in accordance with the present disclosure.

FIG. 6 schematically illustrates an exemplary vehicle 400 including the battery cell switching system 420 of FIG. 1. The battery pack 410 is illustrated including a plurality of battery cells. The battery cells are each connected to the battery cell switching system 420 and may thereby be connected in series, in parallel, or selectively connectible to deliver electrical energy through multiple circuits to vehicle 400 as disclosed herein. The battery pack 410 is illustrated connected to vehicle propulsion system 430, which includes one or more electric machines, such as a boosting motor, operable to provide motive force to the vehicle 400. The computerized battery cell switching controller 100 is illustrated electronically connected to the battery cell switching system 420 and receiving therefrom and providing thereto data and command signals. The battery cell switching system 420 is further illustrated connected to and capable of providing electrical energy to a regenerative braking device 440 and a rear window heating device 450. The vehicle 400 is exemplary and may contain alternative and additional components.

While the best modes for carrying out the disclosure have been described in detail, those familiar with the art to which this disclosure relates will recognize various alternative designs and embodiments for practicing the disclosure within the scope of the appended claims.

What is claimed is:
1. A system for modular dynamically adjustable capacity storage for a vehicle, comprising:
  a battery pack including:
    a plurality of battery cells including a first set of four battery cells, a second set of four battery cells, and a third set of four battery cells;
    wherein the battery cell switching system is further operable to selectively connect the four battery cells in series
    at least one negative terminal including a chassis ground connection; and
    a first positive battery pack terminals, a second positive battery pack terminal, and a third positive battery pack terminal, wherein the at least one negative terminal and the first, second, and third positive battery pack terminals are useful for connecting at least one electrical circuit through the battery pack;

a battery cell switching system, including a plurality of solid-state switches connected to each of the battery cells, wherein the plurality of solid-state switches is operable to:
  selectively connect a portion of the battery cells in parallel;
  selectively connect the portion of the battery cells in series; and
  selectively connect one of the plurality of battery cells to one of the first, second, or third positive battery pack terminals; and a computerized battery cell switching controller operable to:
  determine an operating mode for the vehicle; and
  control the battery cell switching system based upon the operating mode, wherein the computerized battery cell switching controller includes a processing device having an interlock logic module configured to monitor open circuit voltages for individual battery cells and avoid parallel connections between battery cells with battery voltages that differ by more than a predetermined threshold voltage.

2. The system of claim 1, wherein one of the plurality of solid-state switches includes one of a field-effect transistor, a silicon metal-oxide-semiconductor field-effect transistor, a gallium nitride field-effect transistor, a silicon carbide metal-oxide-semiconductor field-effect transistor, or an insulated-gate bipolar transistor.

3. The system of claim 1, wherein one of the plurality of solid-state switches includes a uni-directional voltage blocking capability.

4. The system of claim 1, wherein one of the plurality of solid-state switches includes a bi-directional voltage blocking capability.

5. The system of claim 1, wherein the plurality of solid-state switches is further operable to simultaneously provide electrical energy at 48 Volts through the first of positive battery pack terminals, electrical energy at 12 Volts through the second positive battery pack terminals, and electrical energy at 12 Volts through the third positive battery pack terminals.

6. The system of claim 1, wherein one of the plurality of solid-state switches is selectively operable in an on/off mode and in a linear mode providing impedance matching.

7. The system of claim 1, wherein each of the plurality of battery cells include a cell voltage of 12 Volts;
  wherein the battery cell switching system selectively connecting the first set of four battery cells in series is operable to provide electrical energy at 48 Volts through the first positive battery pack terminals;
  wherein the battery cell switching system is further operable to selectively connect the second set of four battery cells in parallel to provide electrical energy at 12 Volts through the second of the plurality of positive battery pack terminals; and
  wherein the battery cell switching system is further operable to selectively connect a remaining third set of four battery cells in parallel to the third positive battery pack terminals.

8. The system of claim 1, wherein the operating mode is one of an off/test mode, a cold crank mode, a run mode, an auto-start mode, or a regenerative braking/boosting motor mode.

9. The system of claim 1, wherein the battery cell switching system is further operable to provide electrical energy simultaneously to a first 12 Volt circuit and a second 12 Volt circuit; and
  wherein the operating mode is one of a first 12 Volt circuit fault mode or a second 12 Volt circuit fault mode.

10. The system of claim 1, wherein the processing device includes a switch driver circuit module configured to control operation of each of the plurality of solid-state switches.

11. The system of claim 1, wherein the processing device includes an operational mode module configured to monitor parameters of the vehicle to determine the operating mode and a corresponding position for each of the plurality of solid-state switches in the battery cell switching system.

12. The system of claim 1, wherein the interlock logic module includes alternative switch activations for the battery cell switching system configured to achieve a common operating mode of the vehicle.

13. The system of claim 1, wherein the operating mode includes a cold crank mode.

14. A system for modular dynamically adjustable capacity storage for a vehicle, comprising:
  a battery pack including:
    a plurality of battery cells including a first set of four battery cells, a second set of four battery cells, and a third set of four battery cells with each of the plurality of battery cells including a battery cell voltage of 12 Volts;
    at least one negative terminal including a chassis ground connection; and
    a first positive battery pack terminal, a second positive battery pack terminal, and a third positive battery pack terminal, wherein the at least one negative terminal and the first, second, and third positive battery pack terminals are useful for connecting at least one electrical circuit through the battery pack;
  a battery cell switching system, including a plurality of solid-state switches connected to each of the battery cells, wherein the plurality of solid-state switches is operable to:
    selectively connect a portion of the battery cells in parallel to provide electrical energy at 12 Volts;
    selectively connect the portion of the battery cells in series to provide electrical energy at 48 Volts; and
    selectively connect one of the plurality of battery cells to one of the first, second, or third positive battery pack terminals; and
  a computerized battery cell switching controller operable to:
    determine an operating mode for the vehicle; and
    control the battery cell switching system based upon the operating mode, wherein the computerized battery cell switching controller includes a processing device having an interlock logic module configured to monitor open circuit voltages for individual battery cells and avoid parallel connections between battery cells with battery voltages that differ by more than a predetermined threshold voltage.

15. The system of claim 14, wherein one of the plurality of solid-state switches includes one of a field-effect transistor, a silicon metal-oxide-semiconductor field-effect transistor, a gallium nitride field-effect transistor, a silicon carbide metal-oxide-semiconductor field-effect transistor, or an insulated-gate bipolar transistor.

16. The system of claim 14, wherein the interlock logic module includes alternative switch activations for the battery cell switching system configured to achieve a common operating mode of the vehicle.

17. The system of claim 14, wherein the operating mode includes a cold crank mode.

18. The system of claim 14, wherein each of the plurality of battery cells include a cell voltage of 12 Volts;
   wherein the battery cell switching system selectively connecting the first set of four battery cells in series is operable to provide electrical energy at 48 Volts through the first positive battery pack terminal;
   wherein the battery cell switching system is further operable to selectively connect the second set of four battery cells in parallel to provide electrical energy at 12 Volts through the second positive battery pack terminal; and
   wherein the battery cell switching system is further operable to selectively connect the third set of four battery cells in parallel to the third positive battery pack terminal.

19. A method for modular dynamically adjustable capacity storage in a vehicle, comprising:
   utilizing a battery pack including a plurality of battery cells to provide electrical energy to the vehicle through a negative chassis ground connection and one of a plurality of positive battery pack terminals; and
   controlling a battery cell switching system including a plurality of solid-state switches attached to each of the plurality of battery cells, wherein the plurality of solid-state switches is operable to:
   selectively connect a portion of the battery cells in parallel;
   selectively connect the portion of the battery cells in series; and
   selectively connect one of the plurality of battery cells to one of the plurality of positive battery pack terminals; and
   within a computerized battery cell switching controller,
      determining an operating mode of the vehicle; and
      controlling the battery cell switching system based upon the operating mode, wherein the computerized battery cell switching controller includes a processing device having an interlock logic module configured to monitor open circuit voltages for individual battery cells and avoid parallel connections between battery cells with battery voltages that differ by more than a predetermined threshold voltage.

20. The method of claim 19, wherein the interlock logic module includes alternative switch activations for the battery cell switching system configured to achieve a common operating mode of the vehicle and the operating mode includes a cold crank mode.

* * * * *